Feb. 28, 1950 R. S. BAILEY 2,498,635

DUPLEX RADIO SYSTEM

Filed May 21, 1947

INVENTOR.
ROBERT S. BAILEY

BY Robert Harding Jr.
ATTORNEY

Patented Feb. 28, 1950

2,498,635

UNITED STATES PATENT OFFICE 2,498,635

DUPLEX RADIO SYSTEM

Robert S. Bailey, New York, N. Y., assignor to International Standard Electric Corporation, New York, N. Y., a corporation of Delaware Application May 21, 1947, Serial No. 749,512

7 Claims. (Cl. 250—9)

Figures 1, 2:
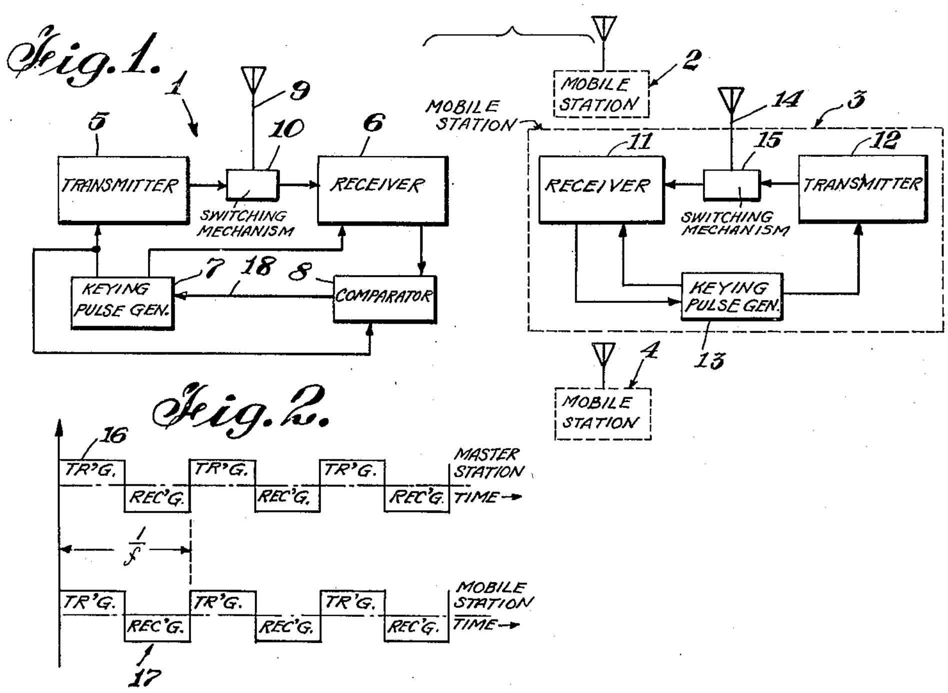

This invention relates to radio communication systems and more particularly to such systems providing two-way communication between two stations on a time-sharing basis.

It is well known that two-way operation between two stations may be obtained by a time-sharing system in which each station alternately transmits for a short time and then receives for a short time, the synchronization between these stations being such that a transmit period from the first station coincides with a receive period of the second station. This system operates well when the respective transmitters are pulsed at a frequency well above the highest audio frequency to be transmitted. It has been found that a pulse repetition frequency at least 2 times the highest audio frequency to be transmitted affords adequate reception. Such a time-sharing system has been used in the past between a so-called master or fixed station and a plurality of mobile stations all using frequency modulation. In such an application it will be apparent that the master station transmit period must coincide with the mobile receive period and that some means must be used to establish this synchronization.

Previous systems have all had the disadvantage that this synchronization has been impossible at both stations when the distance between the stations is varied, as for instance in a police network in which the mobile stations are at varying distances from the master station. This is due to the fact that the propagation time delay of each pulse of transmitted energy varies with the distance between the stations and may arrive when the receive station is not in a condition for reception; i. e., it may be itself transmitting. Systems have been proposed to compensate for this delay over a fixed distance and have included perfect synchronization at the mobile station but not at the master station. In all previous proposals the variable delay between stations has resulted in interference or loss of receiving time at one or both of the stations.

It is an object of the present invention to provide a system whereby perfect synchronization is obtained at both master and mobile stations, whatever the distance between these two.

It is a further object of the invention to vary the pulse repetition frequency of both the stations in a system as referred to hereinabove, so as to make it a function of the distance between the stations whereby perfect synchronization is obtained.

In accordance with certain features of the invention I provide a two-way radio communication system for at least two stations, the distance between the two stations being variable, with means whereby the pulse repetition frequency of both stations is varied in such a way that the distance between the two stations always corresponds to a half-period of the pulse repetition frequency or an odd multiple thereof in order to obtain perfect synchronization of transmission and reception at both stations.

Figure 3:
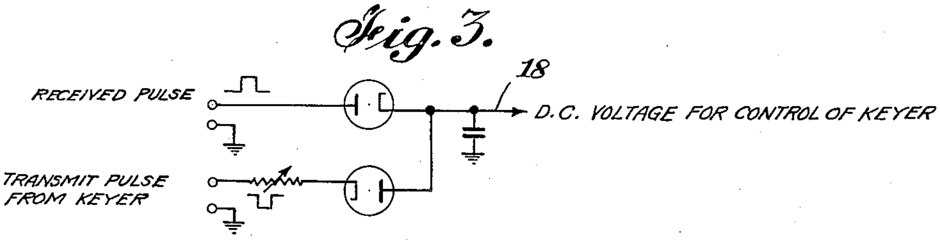
Figure 4:
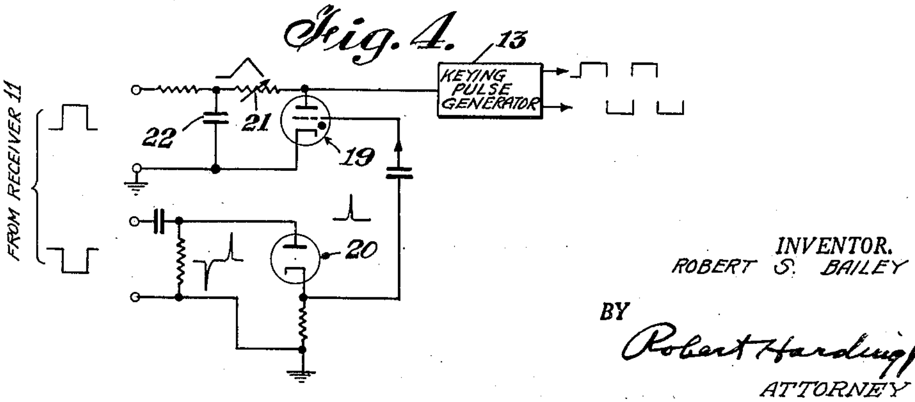

Further objects and features of this invention will become more apparent, and the invention itself, though not necessarily defined by the said features and objects, will be best understood by reference to the following description of an embodiment of the invention taken in connection with the accompanying drawings, wherein:

Fig. 1 is a diagram in block form showing transmitter-receiver combinations for a master or fixed station and a plurality of subsidiary or mobile stations forming a two-way system in accordance with the invention;

Fig. 2 indicates in graph form the operative sequence of certain of the stations of Fig. 1;

Fig. 3 shows in schematic form the diagram of a circuit detail of the master station; and Fig. 4 is a schematic of a circuit detail of one of the mobile stations of the system of Fig. 1.

Referring to the drawings, a two-way communication system is shown in Fig. 1 comprised of a master station as indicated at 1 and one or more subsidiary or mobile stations as shown at 2, 3 and 4 respectively. Of the latter, the stations 2 and 4 are shown in block form indicated in dashed lines, while the station 3 includes major circuit details in block form enclosed in dashed lines.

The master station shown at 1, preferably comprises a transmitter 5, a receiver 6 and a keying pulse generator 7 controlling both the transmitter and the receiver. A comparator circuit 8, is supplied with pulses from the receiver 6 and transmitter control impulses from the keying circuit 7 in order to provide a suitable trigger impulse to the keyer circuit as will be explained in detail hereinafter. The transmitter and receiver may share an antenna 9 through the medium of suitable switching means indicated at 10 preferably timed with the keying pulse generator. If the transmitter power is sufficiently low as not to damage the receiver or pass in spite of the blocking no switching need be used at 10, but merely a single coupling circuit. The mobile stations, as exemplified at 3 are similarly constituted and comprise a receiver 11, a transmitter 12 and a keying pulse circuit 13 controlling both receiver and transmitter operation and being in turn controlled by impulses from the receiver 11. An antenna 14 similar to the arrangement of the master station, is shared between receiver and transmitter through the medium of switching means or coupler 15.

Referring to Fig. 2, graphs *a* and *b* respectively indicate periods of transmission and reception of the master station and one of the mobile or subsidiaries of the system of Fig. 1. A single cycle of repetition frequency *f* of the pulses controlling the operation of the stations is indicated by the reference $$\frac{1}{f}$$

Perfect synchronization of the operation by the two stations forming a two-way system is maintained in accordance with the invention by maintaining the operating pulse frequency at such a value that the distance between the two communicating stations always remains equal to one-half of the period (180°). Thus, signals transmitted during the half cycle shown at 16 from the master station will be fully received during the succeeding half-cycle shown at 17 when the corresponding mobile station is going through its receiving cycle. It will be seen of course, that any odd integral multiple of these half-period spacings will also result in this perfect synchronization.

At the master station the keying pulse or pulse repetition frequency generator which provides alternate transmitting and receiving activation pulses may be of any suitable type such as a multi-vibrator which is controlled from the comparator circuit 8. The comparator circuit for the master station, a preferred form of which is shown in Fig. 3, will be supplied with pulses from the master station receiver as well as with the transmitter activation pulses from the keyer 7. It functions to compare the length of these pulses in any suitable manner such as by means of the averaging D. C. rectifier with an appropriate time constant indicated in Fig. 3. The result of the comparison is then impressed on the pulse repetition frequency generator 7 over a connection 18 to adjust its frequency so that the length of the master transmitter and the receiver activation periods will bear a definite relationship to one another. For example, if a 50% duty cycle is required, the comparator may be adjusted to develop a voltage proportional to the difference in time-length between the receiving activation pulse and the transmitting activation pulse and impress this voltage on the generator to correct its frequency so that these pulses will be of equal length. Thus, at the master station, the comparator causes the master transmitter and receiver to be alternately switched on and off at such a frequency that the received pulse length is always, for example, equal to the transmitted pulse length.

Similarly at the mobile station, the keyer 13 is supplied from the received rectified pulse envelope and impresses alternate activation pulses on the mobile receiver and transmitter in such a way that the length of these activation periods bears a definite relation, for example, a one-to-one ratio corresponding to a 50% duty cycle for the mobile transmitter.

This keyer receives a pulse from the mobile receiver 11 which is equal in length to the master station transmitter activation pulse. In accordance with the circuit shown in Fig. 4, the trailing edge of this pulse may be made to turn on the mobile transmitter. This may be accomplished by the use of a gas-filled triode shown at 19 which is connected in such a way that the inverted square-wave pulse obtained from the receiver, after being differentiated and clipped, supplies a trigger or firing pulse to the tube grid substantially at the time of occurrence of the trailing edge of the square pulse, causing the tube to become conductive and thereby to trigger the keying pulse generator 13. The clipping or rectification of the differentiated pulse is attained by means of a diode 20. Other types of rectifiers, however, are equally suitable. The gas tube 19 will continue firing until an extinction voltage has been reached as determined by a resistance 21 and a condenser 22 which previously had been charged from the uninverted square pulse and which maintains a corresponding potential on the anode of the tube. Thus, the trailing edge of the received pulse will be made to turn on the mobile transmitter, while the deactivation time of the transmitter is controlled by the condenser voltage of the condenser 22 which is proportional to the duration of the received pulse, whereby the deactivation of the transmitter occurs in such a way that the activation time is equal to the receiver activation time. The ratio between the transmitter and receiver activation periods of the station may be varied by suitable adjustment of the respective time constants.

A variable pulse repetition frequency system as described, possesses the property of perfect reception at all points whatever the distance. It is only necessary to provide a pulse repetition frequency variation sufficient to cover a given distance of station separation and the system will then be operative for any multiple of this distance.

It will be clear from the above that whenever it is desirable to vary the average power output of either station, that the system described hereinabove is capable of adjustment for any desired type of duty cycle at either end.

Use of the principle of variable pulse repetition frequency thus will result in perfect transmission and reception conditions between variably spaced stations for any spacings except for a certain minimum spacing, a limitation, which is a function of the highest permissible pulse repetition frequency as determined by design and other considerations.

The system will permit the master station selectively to communicate with any of the desired mobile stations. Should it be desired to transmit a general call to all mobiles it is merely necessary to keep on the master transmitter, so that all mobile transmitters will be blocked.

While I have described above said features and objects of my invention in connection with specific apparatus and particular modification thereof, it is to be clearly understood that this description is made only by way of example and not as a limitation of the scope of my invention.

What is claimed is:

1. A single channel signalling system for two-way communication between stations having a non-constant distance therebetween, comprising a transmitter and a receiver at each of the corresponding stations, means at one station for controlling the division of the operating cycle as between the respective transmitter and receiver, means at the other of said corresponding stations responsive to energy from said one station for controlling the division of the operating cycle of the respective transmitter and receiver in accordance with a given ratio, and means at said one station responsive to a relationship of energy received from said other station and energy from said operating cycle controlling means of said one station for adjusting one half of the operating cycle to at least an odd integral multiple of the propagation time between the said corresponding stations.

2. A system according to claim 1, wherein said adjusting means at said one station comprises means for comparing the length of the active transmitting and receiving period of the one station.

3. A system according to claim 1, wherein said controlling means at the other station includes means for initiating an operating cycle for the receiver in response to initial energy transmitted from said one station and means for terminating said receiver operating cycle in response to energy terminating the transmitting cycle of the said one station.

4. The method of obtaining synchronization on a single channel two-way communication between a master and at least one subsidiary station having a non-constant distance therebetween, comprising, alternately transmitting and receiving at said stations with a given repetition frequency for the operating cycle of the corresponding stations, effecting a comparison at said master station between the periods of the transmitting and the receiving activation pulses, utilizing the results of said comparison for controlling the repetition frequency of the operation activation pulses, and controlling the ratio between the activation pulses at the subsidiary station in response to the received operation activation pulses from the master station.

5. A method according to claim 4, wherein said ratio controlling is adjustable.

6. A single channel communication system for two-way communication between stations having a non-constant distance between them, each station having a transmitter and a receiver, comprising a time dividing switching means at one station for cyclically rendering the corresponding transmitter and receiver operative, means at the other station responsive to receiving of the transmitted energy of said one station for keying into operation the transmitter at said other station for a period corresponding to the period of reception of said energy, and means at said one station responsive to a relationship of received energy from said other station and energy from said time dividing means for adjusting said time dividing means cycle to an odd integral multiple of the propagation time between said stations.

7. For use with a two-way communication system between two stations having a non-constant distance therebetween, a station comprising a transmitter, a receiver, means for providing operation activation pulses for said transmitter and said receiver to effect alternate operation of the responding station, and means for controlling the repetition frequency of said activation pulses in response to activation pulses for said transmitter and to energy received by said receiver, said controlling means comprising a comparator circuit having an averaging direct current rectifier for received energy and for transmitted activation pulses respectively.

ROBERT S. BAILEY.

REFERENCES CITED

The following references are of record in the file of this patent:

UNITED STATES PATENTS

| Number | Name | Date |
|---|---|---|
| 2,045,224 | Gerhard | June 23, 1936 |
| 2,199,179 | Koch | Apr. 30, 1940 |
| 2,419,541 | De Rosa | Apr. 29, 1947 |
| 2,425,314 | Hansell | Aug. 12, 1947 |